United States Patent [19]
Ito

[11] Patent Number: 5,862,418
[45] Date of Patent: Jan. 19, 1999

[54] DISTANCE MEASURING DEVICE FOR A CAMERA

[75] Inventor: Akira Ito, Yotsukaido, Japan

[73] Assignee: Seiko Precision Inc., Japan

[21] Appl. No.: 934,460

[22] Filed: Sep. 19, 1997

[30] Foreign Application Priority Data

Sep. 19, 1996 [JP] Japan .................................. 8-248116

[51] Int. Cl.$^6$ .............................. G03B 13/36; G01C 3/08
[52] U.S. Cl. ........................................... 396/106; 356/3.07
[58] Field of Search .......................... 396/106; 356/3.06, 356/3.07

[56] References Cited

U.S. PATENT DOCUMENTS

| | | | |
|---|---|---|---|
| 5,245,398 | 9/1993 | Ludden | 396/106 X |
| 5,500,728 | 3/1996 | Nishimoto | 396/106 X |

*Primary Examiner*—W. B. Parkey
*Attorney, Agent, or Firm*—Adams & Wilks

[57] ABSTRACT

A distance measurement apparatus comprises a light emitting device for emitting light to an object, a light receiving device including a plurality of photocells for receiving light emitted by the light emitting device and reflected by the object, an adding circuit for adding outputs of an arbitrary number of photocells from among the plurality of photocells, and a control circuit for controlling the light emitting device, the light receiving device and the adding circuit. The control circuit comprises a determining circuit for determining a first group of photocells having a maximum addition result based on the addition performed by the adding circuit, and a calculating circuit for setting a second group of photocells comprised of the first group of photocells and a single or a series of photocells contiguous to the first group of photocells, dividing the second group of photocells into element subgroups, and calculating a distance to an object based on outputs of respective divided element groups.

2 Claims, 10 Drawing Sheets

FIG. 5

| CN | CELL | GN | Vint | Ne |
|----|------|----|------|----|
| 1 | 2+3 | 3 | 13 | 10 |
| 2 | 3+4 | 6 | 14 | 10 |
| 3 | 4+5 | 7 | 16 | 8 |
| 4 | 5+6 | 7 | 12 | 10 |
| 5 | 6+7 | 7 | 4 | 10 |
| 6 | 7+8 | 7 | 1 | 10 |
| 7 | 8+9 | 7 | 1 | 10 |
| 8 | 9+10 | 7 | 1 | 10 |

FIG. 7

| X \ CN | D (m) | | | | | | | |
|---|---|---|---|---|---|---|---|---|
| | 0:2 | 1:3 | 2:4 | 3:5 | 4:6 | 5:7 | 6:8 | 7:9 |
| 0.00 | infinity flag | | | | | | | |
| 0.05 | 18.78 | 3.930 | 2.201 | 1.528 | 1.170 | 0.948 | 0.797 | 0.688 |
| 0.40 | 3.079 | 1.905 | 1.380 | 1.081 | 0.889 | 0.754 | 0.656 | 0.580 |
| 0.45 | 2.747 | 1.773 | 1.309 | 1.037 | 0.859 | 0.733 | 0.639 | 0.567 |
| 0.50 | 2.500 | 1.666 | 1.250 | 1.000 | 0.833 | 0.714 | 0.625 | 0.556 |
| 0.55 | 2.500 | 1.572 | 1.196 | 1.065 | 0.809 | 0.696 | 0.611 | 0.545 |
| 0.60 | 2.104 | 1.481 | 1.143 | 0.930 | 0.784 | 0.678 | 0.597 | 0.533 |
| 0.95 | 1.341 | 1.058 | 0.873 | 0.743 | 0.647 | 0.573 | 0.514 | 0.466 |
| 1.00 | close flag | | | | | | | |

DISTANCE MEASURING DEVICE FOR A CAMERA

BACKGROUND OF THE INVENTION

1. Field of the Invention

The present invention relates to a distance measuring device and, more particularly, to a distance measuring device for a camera which measures the distance to an object to be photographed.

2. Description of Related Art

Conventional distance measuring devices for a camera use photocells comprising divided rows of photocells (silicon photo diode, hereinafter, referred to as "SPD") or one-dimensional position sensitive devices (hereinafter, referred to as "PSD"), or a combination of both SPDs and PSDs.

However, when PSDs are used as photocells, it is difficult to form the PSDs on a chip of an integrated circuit for measuring a distance, which is disadvantageous in terms of the space requirements and increase in manufacturing cost. Further, PSDs are liable to be influenced by external noise and have a low distance resolution. Furthermore, when secondary generated light (hereinafter, referred to as scattered light) is incident on a vicinity of an end portion of the PSDs because light emitted from a chip of a light emitting element is irregularly reflected by a molded package or the like, the accuracy of the distance measurement is further deteriorated.

If the width of the PSD is shortened to improve the resolution of the measured distance, the amount of reflected light from an object positioned a long distance away is small and the photo current which is received from the photocell is further reduced, thereby preventing signal processing from being carried out.

When SPDs are used as photocells, the distance measuring accuracy is deteriorated if the number of photocells is small. On the other hand, if the number of photocells is excessively large, a long period of time is required for measuring a distance, and the cost for manufacturing the distance measuring device is high.

When both PSDs and SPDs are used, control of the distance measuring device becomes complicated and the manufacturing cost increases.

SUMMARY OF THE INVENTION

In view of the foregoing drawbacks in the conventional art, it is an object of the present invention to provide a distance measuring device which can measure a distance with high accuracy and enhanced reliability.

Another object of the present invention is to provide a distance measuring device which is simple in construction and economical to manufacture.

In order to meet the above-described and other objects, the distance measuring device for a camera according to the present invention comprises light receiving means including a plurality of photocells for receiving light reflected by an object, an adding circuit for adding outputs of an arbitrary number of photocells from among the plurality of photocells, and control means for controlling the distance measuring device. The control means includes determining means for determining a first group of photocells having a maximum addition result based on the addition performed by the adding circuit, and calculating means for setting a second group of photocells comprised of the first group of photocells and a single or a plurality of photocells contiguous to the first group of photocells, dividing the second group of photocells into element subgroups, and calculating a distance to an object based on outputs of respective divided element groups.

According to another aspect of the present invention, a distance measuring device for a camera comprises light emitting means for emitting light to an object, light receiving means including a plurality of photocells for receiving light emitted by the light emitting means and reflected by the object, an adding circuit for adding outputs of an arbitrary number of photocells from among the plurality of photocells, determining means for determining a first group of photocells having a maximum addition result based on the addition performed by the adding circuit, and calculating means for setting a second group of photocells comprised of the first group of photocells and a single or a plurality of photocells contiguous to the first group of photocells, dividing the second group of photocells into element subgroups, and calculating a distance to an object based on outputs of respective divided element groups.

BRIEF DESCRIPTION OF THE DRAWINGS

FIG. 5 shows a table stored in RAM used for a gain determining operation according to the embodiment of the present invention;

FIG. 7 shows a table stored in the RAM of the embodiment of the present invention;

DETAILED DESCRIPTION OF THE PREFERRED EMBODIMENTS

Figure 1:
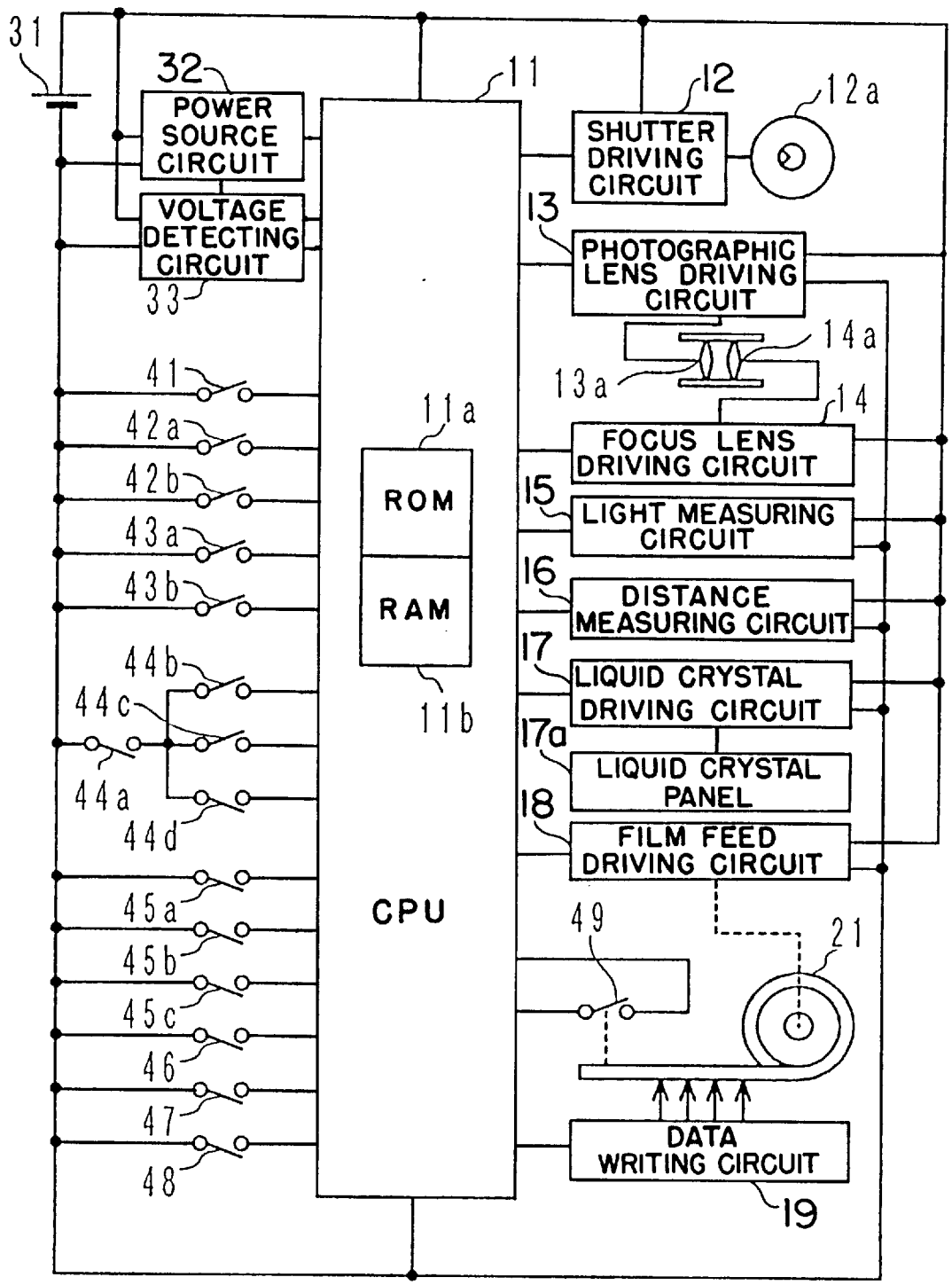
FIG. 1 is a block diagram of a camera using a distance measuring device according to an embodiment of the present invention.

FIG. 1 is a block diagram showing the construction of an embodiment of a camera having a distance measuring device according to an embodiment of the present invention. A CPU 11 incorporates a non-volatile read only memory (hereinafter, referred to as "ROM") 11a for governing and controlling a camera and storing programs and data for the camera, and a random access memory (hereinafter, referred to as "RAM") 11b used for calculations and temporary storage. As further described below, RAM 11b previously stores data shown by FIG. 7 and programs including routines shown by FIG. 8 through FIG. 11. RAM 11b is allocated at predetermined addresses with a region for storing or calculating numerical values or amounts such as numbers of times K1 and K2, an offset voltage change rate Ofs, values N1, N2 and X, control signals CN and GN, a voltage Vdi and a value Ndi, and a region for storing flags such as an infinity flag Fi, a close flag Fc and the like.

A shutter driving circuit 12 performs exposure operations by driving a shutter 12a in accordance to instructions from the CPU 11. When a zoom-tele driving switch 42b is pushed down, the CPU 11 drives a zoom lens 13a to the telescopic side by controlling a photographing lens driving circuit 13. The CPU 11 drives the zoom lens 13a to the wide angle side when a zoom-wide driving switch 42a is pushed down. The zoom lens 13a is driven to the telescopic side or the wide angle side only while the switch 42a or 42b is being pushed down, and the zoom lens 13a is not driven when the switches are released, such as when the pressure on the switch from a user's finger is released. The zoom ratio is changed in accordance with the movement of the zoom lens 13a, and a diaphragm setting at a fully opened state Av of the zoom lens 13a is then changed. Accordingly, the CPU 11 reads code patterns of zoom encoders 45a through 45c in conjunction with the movement of the zoom lens 13a, calculates a current zoom ratio, and converts the calculated zoom ratio into the diaphragm setting at a fully opened state Av of the zoom lens 13a in accordance with a table stored in ROM 11a.

A focus lens driving circuit 14 moves a focus lens 14a to a position where an object is focused prior to the exposure operation according to a signal from a distance measuring circuit 16 described further below.

A light measuring circuit 15 measures brightness of an object in accordance to instructions from the CPU 11 and outputs the result to the CPU 11. The CPU 11 calculates a measured light value Bv from the resulting measured brightness in accordance with a table of measured light values stored in ROM 11a. The distance measuring circuit 16 measures a distance to an object in accordance to instructions from the CPU 11 and outputs the result to the CPU 11. The CPU 11 calculates a distance D from the result in accordance with a table of measured distance value stored in ROM 11a. A liquid crystal driving circuit 17 performs display on a liquid crystal panel 17a based on a signal outputted from the CPU 11.

A data writing circuit 19 writes data, such as date, time, etc., on a face of a film by controlling light emitting means such as an LED (Light Emitting Diode) or the like installed on the side opposed to the face of the film in accordance to instructions from the CPU 11.

Next, an explanation will be given of respective switches shown in FIG. 1. A main switch 41 is a push switch for enabling the operation of a camera and performs toggling action where the camera is made operational or nonoperational every time the main switch 41 is pushed. Both of the zoom-wide driving switch 42a and the zoom-tele driving switch 42b are push switches. A back lid switch 48 detects opening and closing of a back lid of the camera. A half-push switch 43a is turned ON when it is pushed down by a half of a stroke, that is, when it is pushed to an intermediate position thereof, and a full-push switch 43b is turned ON when it is pushed down fully. The full-push switch 43b generates a release signal.

Film sensitivity reading switches 44a through 44d are switches for reading code patterns printed on a film case. The CPU 11 calculates a film sensitivity Sv from the read code patterns. Zoom encoders 45a through 45c change patterns printed on a lens barrel where the zoom lens 13a is provided into electric signals and output the electric signals to the CPU 11. These electric signals are used for recognizing the position of the lens barrel. The CPU 11 calculates an optimum exposure value using a known apex calculation method from the measured light value Bv, the film sensitivity Sv and the diaphragm setting at a fully opened state Av, and then carries out an exposure operation.

A mode switch 46 sets a plurality of modes for the camera, such as normal photographing, macrophotographing, and self timer photographing, every time the mode switch is pushed down.

A feed detecting switch 49 generates pulse-like signals for detecting perforations (frame feeding holes) of a moving film 21 when the film 21 is wound or rewound. When the back lid of the camera is closed under a state where the film 21 is charged into the camera, the back lid switch 48 is turned OFF. When this state is detected, the CPU 11 operates a film feed driving circuit 18 and winds up the film 21. A braking condition is given to the film feed driving circuit 18 when a series of pulses of the feed detecting switch 49 which is inputted reaches a predetermined number, by which feeding of the film 21 is completed. Further, a winding condition is given to the film feed driving circuit 18 after completion of a photographing operation and the braking condition is given thereto when the series of pulses of the feed detecting switch 49 reaches the predetermined number by which winding of one frame is performed.

A power source (e.g., battery) 31 is connected to the CPU 11, the shutter driving circuit 12, the photographing lens driving circuit 13, the focus lens driving circuit 14, the light measuring circuit 15, the distance measuring circuit 16, the liquid crystal driving circuit 17 and the film feed driving circuit 18 for supplying a source of power. The voltage of the battery 31 is boosted by a power source circuit 32 and the boosted voltage is always monitored by voltage detecting means comprising a voltage detecting circuit 33. When a result of measurement by the voltage detecting means indicates a predetermined voltage Vlow or lower, a voltage detection signal LO is outputted to the CPU 11, and the CPU 11 prohibits operations of photographing, zoom driving, film feeding, stroboscopic lamp charging and the like which apply a load on the power source 31 of the camera. When the result of measurement by the voltage detecting means indicates a predetermined voltage Vres that is lower than the voltage Vlow, a reset signal RE is outputted to the CPU 11, whereby the CPU 11 is brought into a reset state and all the operations cannot be performed. This operation aims at preventing erroneous operations by the CPU 11 caused by a lowering of the power source voltage. When the power source voltage is equal to or higher than the voltage Vres, start switches of the CPU 11, such as the main switch 41, the zoom-wide driving switch 42a, the zoom-tele driving switch 42b, the half-push switch 43a, the back lid switch 48 and the like are operated and, further, the CPU 11 starts the operations and executes an initializing program previously written to the ROM 11a.

Figure 2:
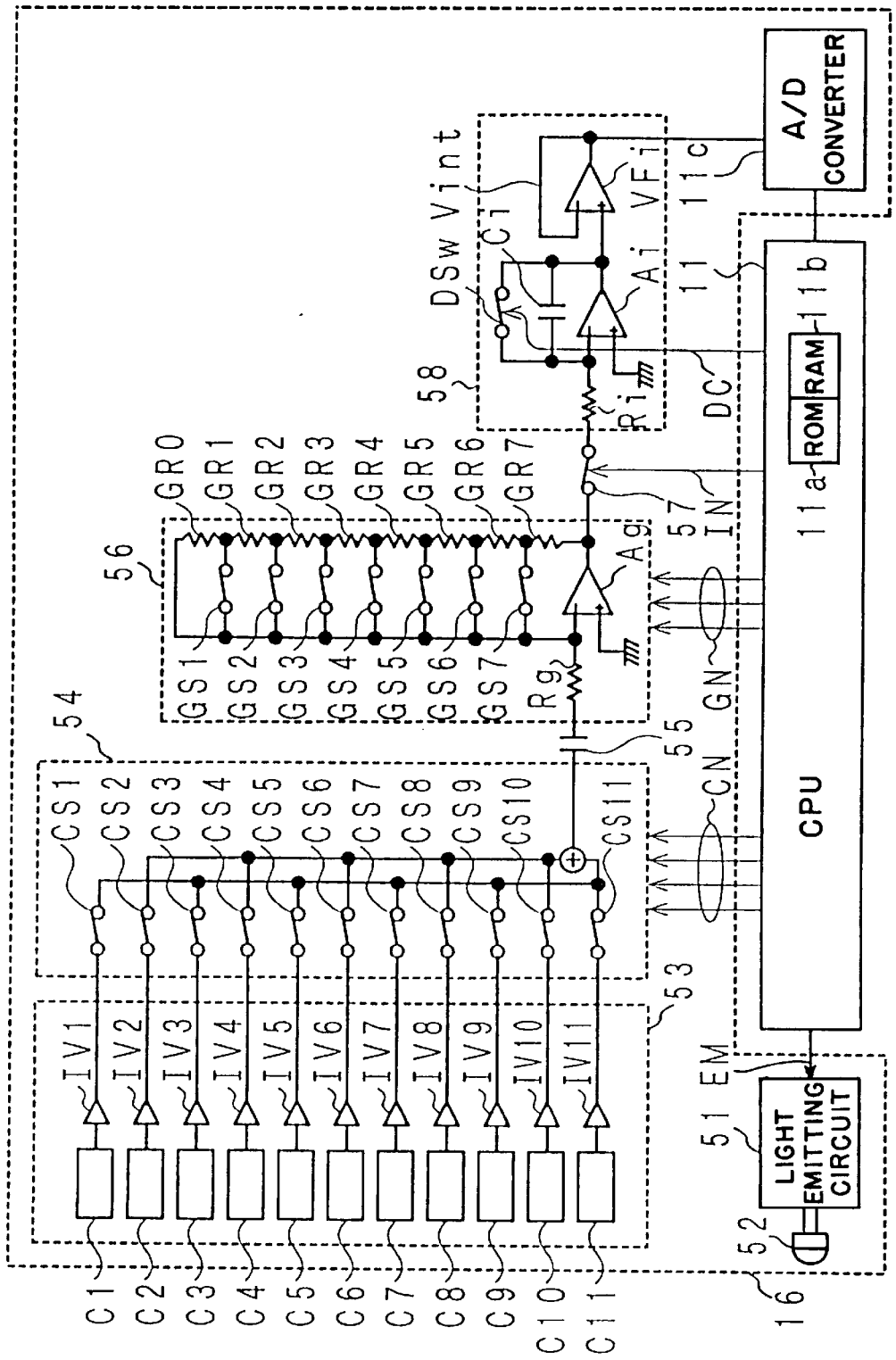
FIG. 2 is a circuit diagram of the distance measuring device according to an embodiment of the present invention.

FIG. 2 is a circuit diagram of the distance measuring circuit 16 showing in FIG. 1. Cells C1 through C11 constitute a row of photocells, such as SPDs, where each SPD has a width of 0.1 mm and a length of 0.8 mm, and a clearance between contiguous SPDs is 0.01 mm. Accordingly, the width of a total of the cells C1 through C11, including the clearance between the SPDs, cells, is 1.2 mm. The cell C1 on the long distance side is the nearest to light emitting elements and, conversely, the cell C11 on the short distance side is the most remote from the light emitting elements.

Current voltage converting circuits IV 1 through IV 11 convert respective output currents from the cells C1 through C11 into voltages and output the voltages to an adder 54. The CPU 11 controls an output from the adder 54 by a control signal CN of 4 bits. More specifically, based on the value of the control signal CN, the adder 54 outputs one of 10 different outputs, that is, a sum of outputs from the current voltage converting circuits IV 1 and IV 2 by turning the switches CS 1 and CS 2 ON when the control signal CN is 0, a sum of outputs from the current voltage converting circuits IV 2 and IV 3 by turning the switches CS 2 and CS 3 ON when the control signal CN is 1, . . . , a sum of outputs from the current voltage converting circuits IV 10 and IV 11 by turning ON the switches CS 10 and CS 1 when the control signal CN is 9.

A coupling condenser 55 passes only an alternating current component of the output from the adder 54. An amplifying circuit 56 amplifies the output from the adder 54 by a predetermined gain. Switches gain of rough GS 7 determine the gain of the amplifying circuit 56. The CPU 11 controls the gain of the amplifying circuit 56 by changing a feedback resistance value of an operational amplifier Ag by a control signal GN of 3 bits. More specifically, all of the switches GS 1 through GS 7 are turned OFF when the control signal GN is 0. The gain in this case is a maximum value of 512. When the control signal GN is 1, the switch GS 1 is turned ON and the gain in this case is a half of the maximum value of 265. In this way, when the control signal GN is 2, the switch GS 2 is turned ON and the gain is 128, when the control signal GN is 3, the switch GS 3 is turned ON and the gain is 64, . . . , and when the control signal GN is 7, the switch GS 7 is turned ON and the gain is a minimum value of 4. Although the amplifying circuit 56 is shown as a single amplifier for convenience of explanation, it is actually constituted by two amplifiers and, therefore, the polarities of the input and output signals are the same.

A switch 57 turns an output signal from the amplifying circuit 56 ON or OFF based on a control signal IN. An integrating circuit 58 comprises an operational amplifier Ai, an integrating condenser Ci and a voltage follower Vfi. A switch DSw is turned ON by a control signal DC from the CPU 11, whereby an electric charge of the integrating condenser Ci is discharged. The voltage follower Vfi subjects an output voltage from the operational amplifier Ai to impedance conversion and outputs the conversion result to an analog/digital (hereinafter, referred to as A/D) converter 11c. The A/D converter 11c is an A/D converter of 8 bits which converts an output voltage from the voltage follower Vfi into a digital value and outputs the value to the CPU 11. An input voltage to the A/D converter 11c is 4.2 volt which is equally divided into 256 parts, whereby a voltage per digit is 16.4 mvolt.

Next, an explanation will be given of the operation of the distance measuring circuit 16 shown in FIG. 2 with reference to FIG. 3 and FIG. 4. In the explanation which follows, "cell" designates one of the eleven photocells C1 to C11, "double-cell" designates a group of two contiguous cells, and "couple" designates a combination of "double-cells".

The distance measuring operation comprises three stages: determining a gain, measuring a distance, and measuring an offset voltage change rate. First, the gain of the operational amplifier Ai is determined by the following procedure. In this procedure, a double-cell couple for measuring the distance that is used in the distance measuring operation is selected. First, the CPU 11 outputs 1 to the control signal CN, selects a double-cell comprising the cells C2 and C3 prior to emitting a signal light and controls the double-cell such that a sum of the voltages of the double-cell constitutes an output of the adder 54. In this case, the feedback resistance value of the operational amplifier Ag is at the maximum and, accordingly, the gain of the operational amplifier Ag is maximized (Ta of FIG. 4).

At this point, the CPU 11 then generates a light emitting signal EM and a light emitting circuit 51 generates a predetermined number of drive pulses Ngs (for example, 10 pulses), and a light emitting element 52 emits pulses of light toward an object by inputting the predetermined drive pulses. At first, the outputs of the cells C2 and C3 are subjected to current/voltage conversion and amplified by the amplifying circuit 56, and the output voltage Vint is subjected to impedance conversion by the voltage follower Vfi and is outputted to the A/D converter 11c. At this point, the CPU 11 maintains the switch 57 turned OFF until a time period T1 (for example, 10 microseconds) has elapsed after the start of light emission in order to secure rise times of the respective amplifiers accompanied by the start of light emission and alleviate the influence of power source variations, and maintains the switch 57 ON for a time period T2 (for example, 10 microseconds) by generating the control signal IN when the time period T1 has elapsed. After finishing the operation, the CPU 11 stops the light emitting operation and the integrating operation and awaits for a time period T3 (for example, 200 microseconds). This operation is repeated a predetermined number of times. The CPU 11 compares the voltage Vint with a previously set voltage Vgs, and if the voltage Vint is larger than the voltage Vgs, the CPU 11 decreases the gain by turning the switches GS 1, GS 2, . . . , GS 7 ON in this order, and the emission of the signal light is repeated again. In this case, the voltage Vgs is set to 16 digits, that is, approximately 260 mvolt.

Figure 4:
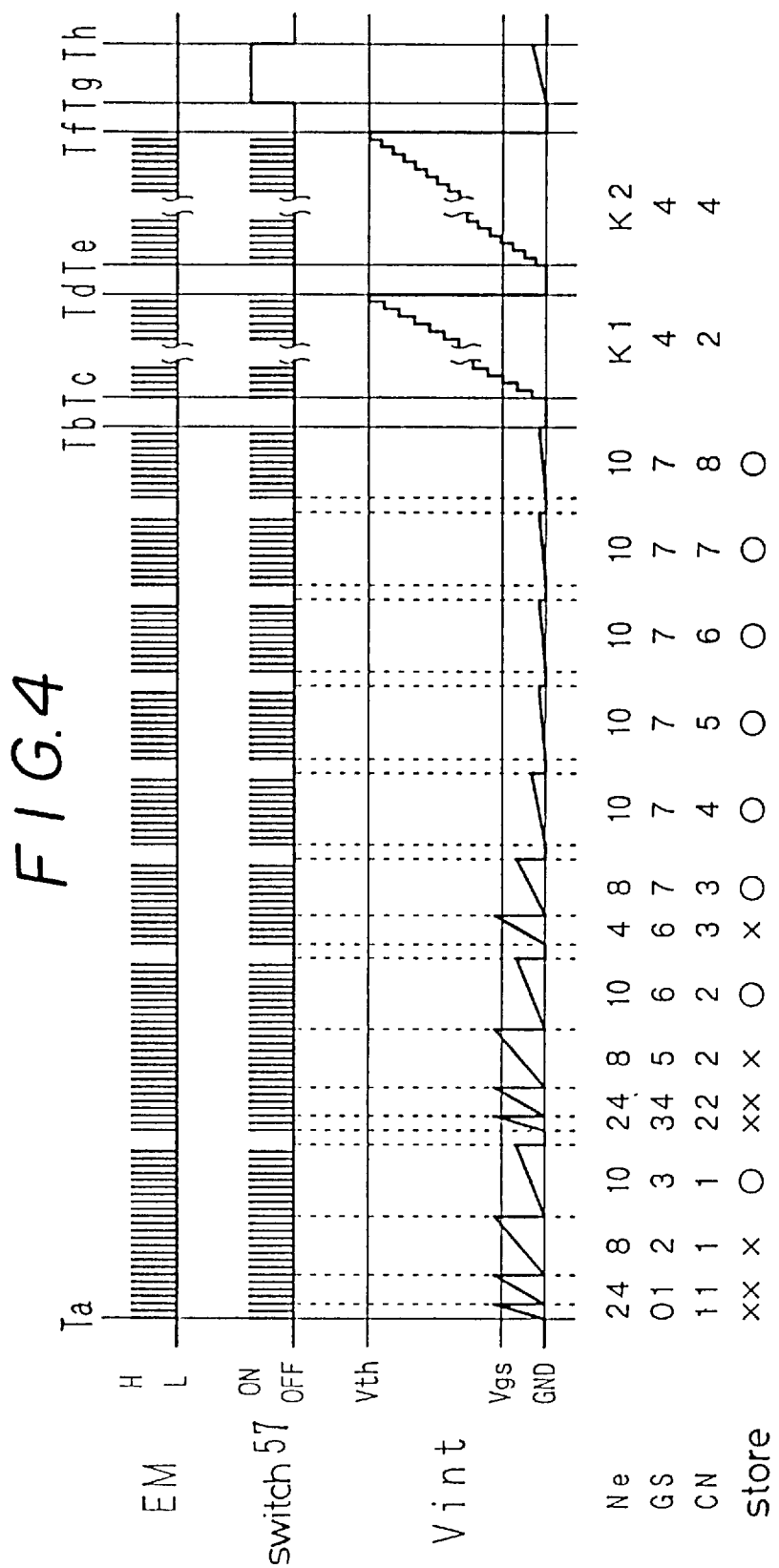
FIG. 4 is a time-sequential diagram for explaining the operation of the embodiment of the present invention.

In FIG. 4, "GS" designates the number of switches that are turned ON. As has been described, "0" signifies that all of the switches GS 1 through GS 7 are turned OFF. If the number is "1", the switch GS 1 is turned ON, and if the number is "7", the switch GS 7 is turned ON. Further, "CN" is a value of the control signal CN representing a double-cell currently selected. As has been described, when the control signal CN is 0, a double-cell comprising the cells C1 and C2 is selected, when the control signal CN is 1, a double-cell comprising the cells C2 and C3 is selected etc., by which the double-cells of the 10 different output combinations are selected until the control signal CN reaches 9.

When the voltage Vint becomes smaller than the voltage Vgs as a result of light emission by the number of times Ngs, the control signal CN, the control signal GN, the voltage Vint and the value of a number of pulses Ne at this time are respectively stored as illustrated by FIG. 5. Thereafter, the cells C3 and C4 constituting a successive double-cell are again selected, and the operation is repeated from emission of a signal light. Further, when the voltage Vint exceeds the voltage Vgs before the light emission by the number of times Ngs, if the control signal GN is smaller than 7, the gain is excessively large and, accordingly, the gain is decreased by adding 1 to the control signal GN. When the control signal GN is already 7, it is impossible to set a gain of 7 or lower and the control signal CN, the control signal GN, the voltage Vint and the value Ne in this case are also stored as illustrated by FIG. 5.

Figure 3:
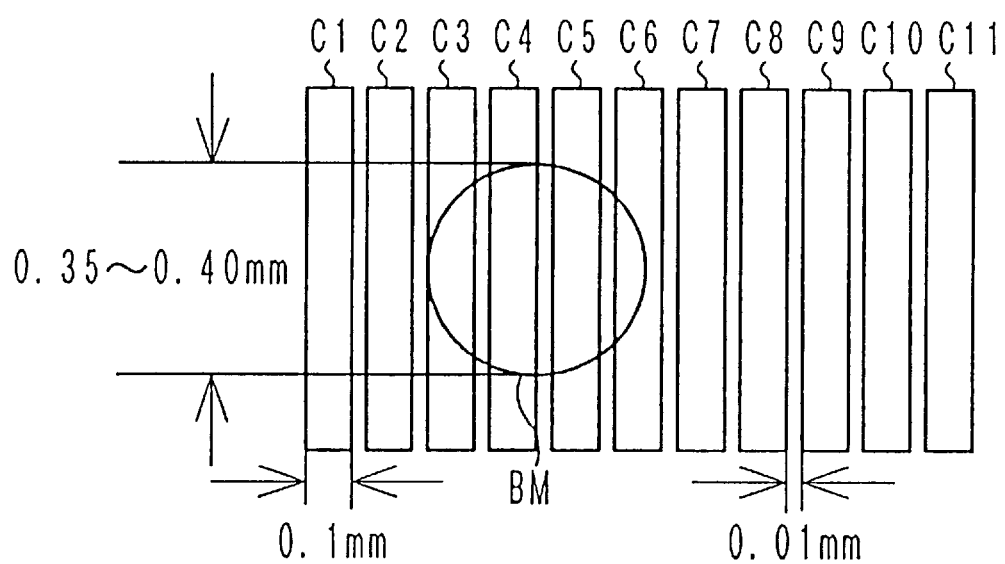
FIG. 3 is a view showing light receiving element cells and light incident on a face of the light receiving element cells according to the embodiment of the present invention.

In FIG. 3, a received light beam BM is incident on the cells C3 through C6 and, accordingly, an output of a double-cell comprising the cells C4 and C5 is maximized. Therefore, as is apparent from FIG. 4, a double-cell comprised of the cells C3 and C4 (CN=2) and a double-cell comprised of the cells C5 and C6 (CN=4) are selected as the double-cell couple for measuring the distance. In this way, the respective control signals CN of the double-cell couple for measuring the distance necessarily differ by 2. Although the diameter of the received light beam is 0.35 mm in this case, the value differs depending on the distance of an object and the optical system is adjusted such that the value becomes approximately 0.35 through 0.40 mm. Accordingly, the number of cells used in the distance measurement is most suitably 4.

When the gain determining information having the control signals CN of 1 through 8, that is, ranging from the double-cell comprised of the cells C2 and C3 to the double-cell comprised of the cells C9 and C10, is stored to the table in RAM 11$b$ shown in FIG. 5, the double-cell couple for measuring the distance is finally selected as follows. First, when there are double-cells in each of which the control signal GN reaches 7, the double-cell couple including therebetween a double-cell having the least value of Ne is determined as the double-cell couple for measuring the distance. When there are a plurality of double-cells in each of which the control signal GN reaches 7 and the value Ne is the number of times Ngs, the double-cell couple including therebetween a double-cell having the largest voltage Vint is determined as the double-cell couple for measuring the distance. Further, when there is no cell in which the control signal GN reaches 7, the double-cell couple including therebetween a double-cell having the largest voltage Vint among the double-cells in each of which the control signal GN is large, that is, the double-cells in each of which the light emitting operation is finished by the lowest gain, is determined as the double cell couple for measuring the distance.

In the case of FIG. 5, the control signal GN is 7 when the control signals CN are 3 through 8, that is, from the double-cell of the cells C4 and C5 through the double-cell of the cells C9 and C10 where the light emitting operation is carried out with the maximum gain. Among them, the values Ne are provided with values of 8 and 10 and the value Ne is the least when the control signal CN is 3. The double-cell having the control signal CN of 3 is comprised of the cells C4 and C5 and, therefore, the double-cell couple which includes therebetween the double-cell C4 and 5 is the double-cell couple of the cells C3 and C4 and the cells C5 and C6 and these double cells are used respectively in the following distance measuring operation.

When the double-cell couple for measuring the distance is determined in this way, the distance measuring operation is carried out. First, the CPU 11 controls a sum voltage of an output from one of the double-cells selected for measuring distance (in this example, the double-cell comprised of cells C3 and C4) to be an output from the adder 54, turns the switch DSw ON by outputting the control signal DC, discharges all the remaining electric charge of the integrating condenser Ci and, thereafter, outputs the light emitting signal EM, whereby pulses of light similar to those in the case of gain determination is emitted from the light emitting circuit 51 toward the object (Tc of FIG. 4). The output from the adder 54 at this point is amplified by the operational amplifier Ag, integrated at the operational amplifier Ai and outputted to the A/D converter 11$c$ at the voltage follower Vfi. The CPU 11 compares the output voltage Vint from the A/D converter 11$c$ with a predetermined voltage Vth, stops emitting the pulses of light when the voltage Vint becomes equal to or higher than the voltage Vth, and stores a number of emissions until then at a pertinent address of RAM 11$b$ as a number of times K1 (Td of FIG. 4). Here, the voltage Vth is set to 56 digits, that is, approximately 920 mvolt.

The same operation is repeated also with respect to the other one of the double-cells selected for measuring distance (in this example, the double-cell comprised of cells C5 and C6) (Te of FIG. 4) and the number of emissions is stored at a pertinent address of RAM 11$b$ as a number of times K2 (Tf of FIG. 4).

A case will now be considered where scattered light is incident on the photocells. Normally, scattered light is incident on a position remote from the position of the received light beam with intensity far weaker than that of the received light beam. Accordingly, when a photocell providing an output continuously, such as PSDs, SPDs or the like are used in measuring a distance, a signal current caused by the influence of the scattered light cannot be separated. However, according to the distance measuring device of this embodiment, outputs from cells other than the double-cell couple for measuring the distance are not used in measuring the distance and, accordingly, there is almost no influence of the scattered light, effecting the measured distance.

Finally, the offset voltage change rate Ofs is measured to remove an influence of the offset voltage. First, after discharging all of the electric charge remaining in the integrating condenser Ci by turning the switch DSw ON, the switch 57 is turned ON and only external light is integrated over a predetermined time period Tofs without emitting light by the light emitting circuit 51 (Tg of FIG. 4). At this point, a potential difference is caused between terminals of the integrating condenser Ci due to influence of drift currents of the operational amplifier Ag, and the operational amplifier Ai and the voltage Vint across the terminals of the integrating condenser Ci is changed to a positive or negative value. After the time period Tofs has elapsed, the switch 57 is turned OFF, and the offset voltage change rate Ofs per unit time is calculated by dividing the voltage Vint by the time period Tofs (Th of FIG. 4).

Successively, a value N1 is calculated by the following equation (1) from the number of times K1 stored in RAM 11$b$ and a value N2 is calculated by equation (2) from the number of times K2, respectively.

$$N1=(Vth*K1)/(Vth-Ofs*K1*T2) \qquad (1)$$

$$N2=(Vth*K2)/(Vth-Ofs*K2*T2) \qquad (2)$$

When the values N1 and N2 and the offset voltage change rate Ofs are calculated as described above, the CPU 11 reads these values from RAM 11$b$ and calculates a value X based on equation (3).

$$X=N1/(N1+N2)$$

Figure 6:
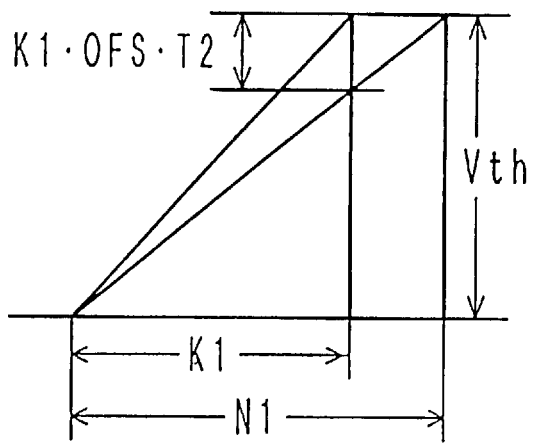
FIG. 6 is an explanatory view for explaining the principle of calculating offset according to the embodiment of the present invention.

The principle of calculating the values N1 and N2 from the number of times K1 and K2 is shown in FIG. 6. When the voltage reaches the voltage Vth by light emission of a number of times K1, an offset voltage caused by drift currents of the amplifying circuit 56 and the integrating circuit 58 is inevitably included. This corresponds to a voltage designated by Ofs*K1*T2. Therefore, if there is no offset voltage, the voltage does not reach the voltage Vth when light emission is not carried out by the value N1. The value N1 is calculated as in equation (1) by the principle of similar triangles. The value N2 is similarly calculated from the number of times K2. Although the offset voltage can be positive or negative, it can be calculated by the same equation by the principle described above in either of the cases.

When the value X is calculated, the CPU 11 calculates the distance to an object with reference to a table corresponding to a double-cell couple for measuring distance, in ROM 11a shown by FIG. 7, drives the focus lens 14a to a focusing position by means of the focus lens driving circuit 14, and opens and closes the shutter 12a by means of the shutter driving circuit 12, whereby exposure is performed with respect to the film 21.

Figure 8:
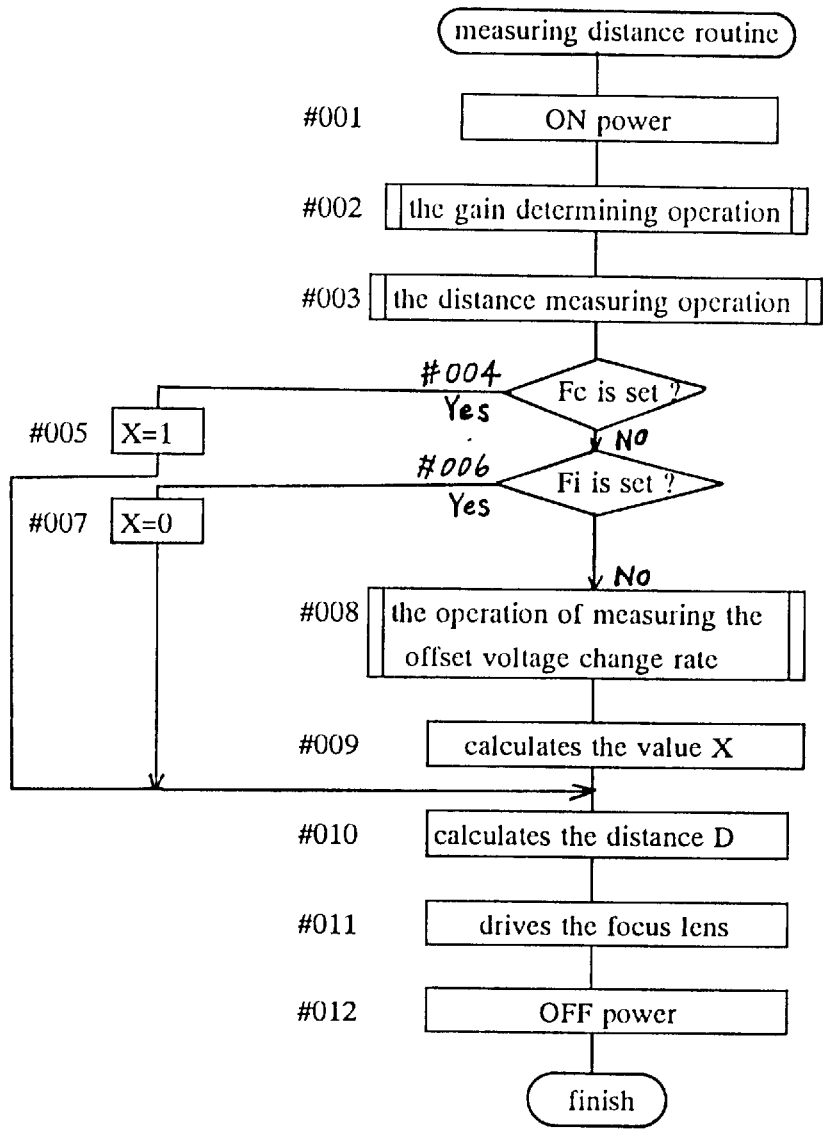
FIG. 8 shows a main routine indicating a distance measuring operation of the embodiment of the present invention.

The above-described distance measuring operation is represented by flowcharts as shown by FIG. 8 through FIG. 11. First, an explanation will be given of a main flowchart with reference to FIG. 8. When the CPU 11 detects operation of the full-push switch 43b, the CPU 11 carries out a light measuring operation and successively proceeds to the distance measuring operation as shown by FIG. 8. When the CPU 11 proceeds to the distance measuring operation, the CPU 11 first turns the power source of the distance measuring circuit 16 ON (#001). Successively, the CPU 11 determines the gain of the amplifying circuit 56 and determines the values of the control signal GN and the control signal CN (#002). After finishing this operation, the CPU 11 calculates the numbers of times K1 and K2 by carrying out the distance measuring operation (#003). At this point, when a close flag Fc is set, the CPU 11 respectively sets the value X to 1 (#005). In contrast, when an infinity flag Fi is set (#006), the CPU 11 sets the value X to 0 and jumps to step #010. Thereafter, the CPU 11 calculates the offset voltage change rate Ofs by measuring the offset voltage (#008). The CPU 11 then calculates the value X from the numbers of times K1 and K2 and the offset voltage change rate Ofs (#009), calculates a distance D from the value X with reference to the table stored in ROM 11a as shown by FIG. 7 (#010), and drives the focus lens 14a to the focus position (#011). Finally, the CPU 11 turns the power source of the distance measuring circuit 16 OFF (#012), finishes the routine and opens and closes the shutter 12a by which exposure is carried out with respect to the film 21.

Figure 9:
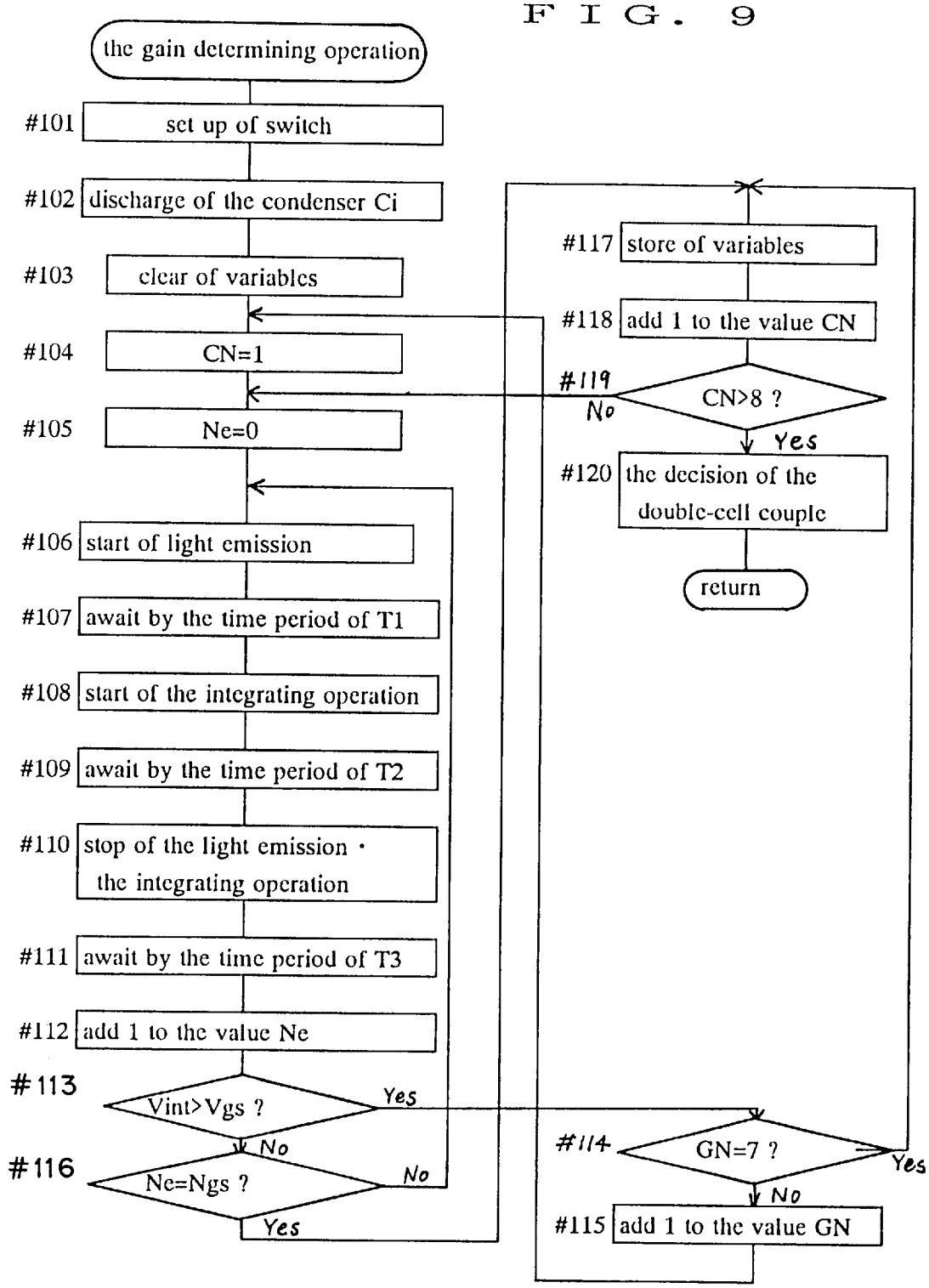
FIG. 9 shows a subroutine indicating a gain determining operation of the embodiment of the present invention.
Figure 10:
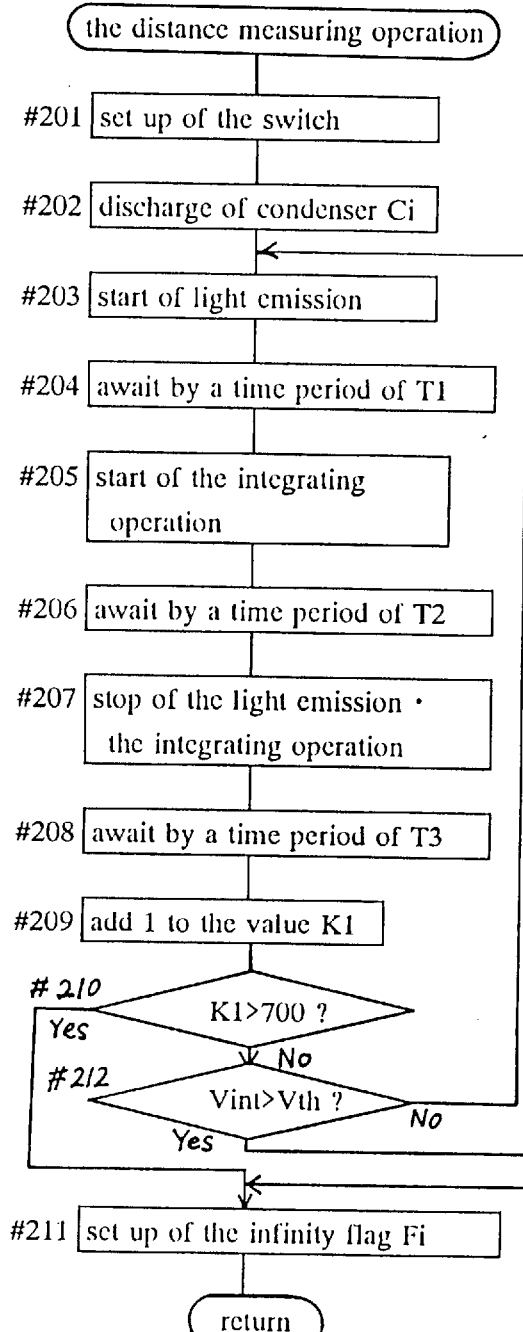
FIG. 10 shows a subroutine indicating a distance measuring operation of the embodiment of the present invention.
Figure 10:
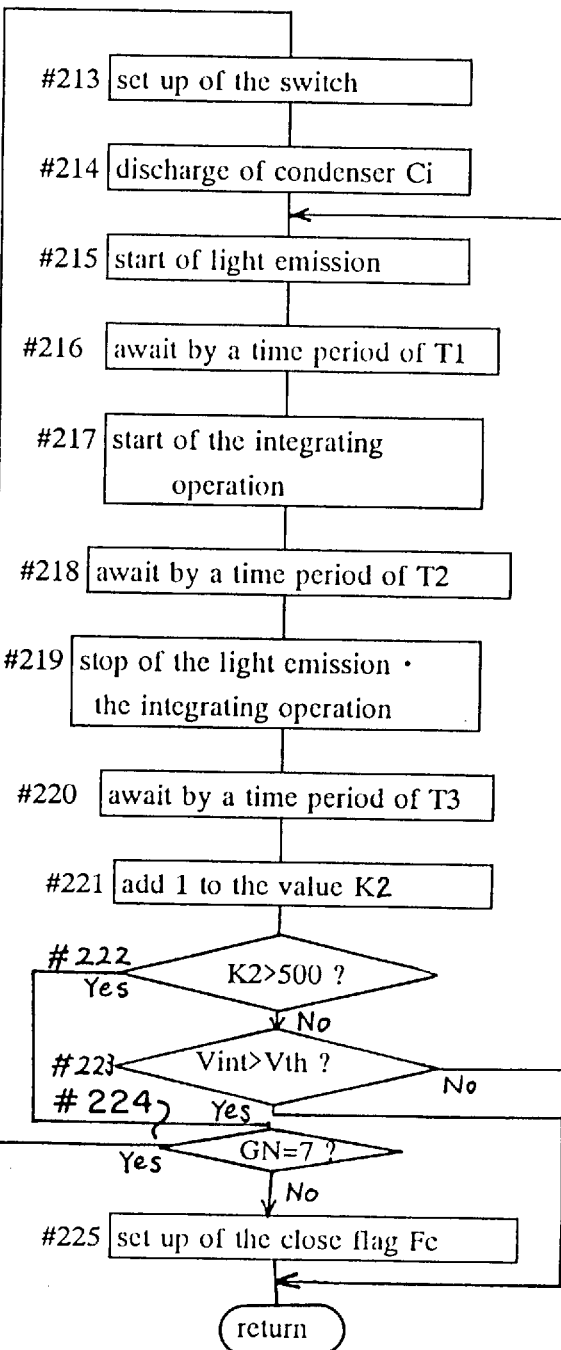
Figure 11:
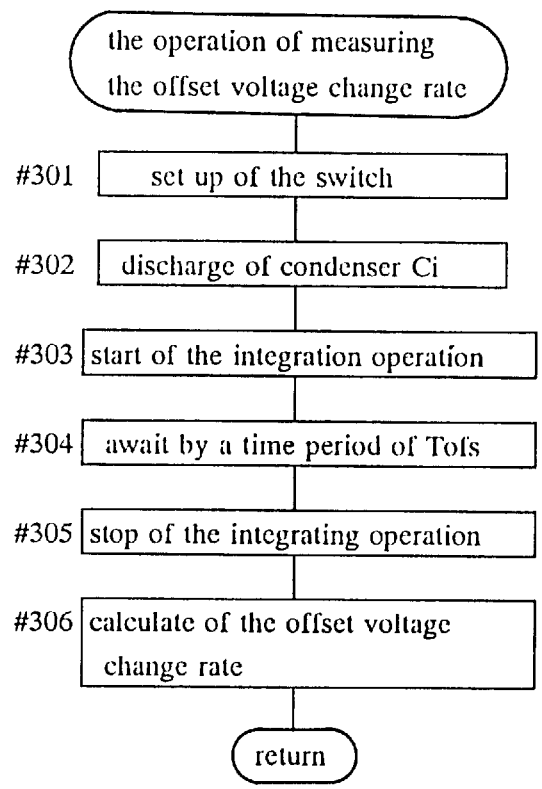
FIG. 11 shows a subroutine indicating an operation of measuring an offset voltage change rate in the embodiment of the present invention.

Next, an explanation will be given of respective subroutines for the gain determining operation at #002, the distance measuring operation at #003, and the operation of measuring the offset voltage change rate at #008 with reference to FIG. 9, FIG. 10 and FIG. 11, respectively.

First, an explanation will be given of the subroutine for the gain determining operation at #002 with reference to FIG. 9. When the CPU 11 proceeds to the subroutine, the CPU 11 sets respective control lines to "L" to turn all of the switches of the distance measuring circuit 16 OFF (#101). The CPU 11 clears the control signal GN, the control signal CN and the value Ndi respectively to 0, sets the voltage Vdi to 0 volt, and respectively resets the infinity flag Fi and the close flag Fc (#102).

Successively, the CPU 11 turns the switch DSw ON by setting the control signal DC to "H" level and discharges the electric charge remaining in the integrating condenser Ci. After discharging the electric charge, the control signal DC becomes "L" (#103). The control signal CN is then set to 1 (#104) and the value Ne is cleared to 0 (#105).

Thereafter, CPU 11 outputs the light emitting signal EM and emits measuring light to an object (#106). At this point, the CPU 11 awaits until a time period T1 has elapsed from the start of light emission to secure rise times of the respective amplifiers accompanied by the start of light emission and to alleviate the influence of power source variations (#107). The CPU then starts the integrating operation by setting the control signal IN to "H" when the time period T1 has elapsed (#108). The CPU 11 then awaits until a time period T2 has elapsed (#109). When the time period T2 has elapsed, the CPU 11 stops light emitting and integrating operations (#110) and awaits until a time period T3 has elapsed (#111). The CPU 11 then adds 1 to the value Ne (#112). The CPU 11 then compares the voltage Vint with the voltage Vgs (#113), and when the voltage Vint is larger than the voltage Vgs, the CPU 11 jumps to #114. When the voltage Vint is larger than the voltage Vgs, the CPU 11 successively confirms whether the control signal GN is 7 (#114), and when the control signal GN is less than 7, the CPU 11 adds 1 to the control signal GN (#115) and jumps to #104. When the control signal GN is 7, the CPU 11 jumps to #117.

When the voltage Vint is equal to or less than the voltage Vgs at #113, the CPU 11 confirms whether the value Ne is equal to the predetermined number Ngs such as, for example, 10 (#116), and when the value Ne is less than 10, the CPU 11 jumps to #106 and repeats light emitting and integrating operations. When the value Ne is equal to 10, the CPU 11 stores current values of the control signal CN, the control signal GN, the voltage Vint and the value Ne respectively to predetermined addresses of RAM 11b as shown by FIG. 5 (#117). Thereafter, the CPU 11 adds 1 to the control signal CN (#118) and confirms whether the control signal CN reaches 10 (#119). When the control signal CN does not reach 10, since double-cells to which light emission is not finished remain, the CPU 11 returns to #105. When the control signal CN reaches 10, the light emission has been carried out with respect to all of the double-cells and, accordingly, the CPU 11 determines the double-cell couple to be used for the distance measuring operation with reference to FIG. 5 and finishes the subroutine.

Next, an explanation will be given of the subroutine for the distance measuring operation at #003 in FIG. 8 with reference to FIG. 10. When the CPU 11 proceeds to the subroutine, the CPU 11 outputs a signal selecting one of the double-cells for measuring distance that is near to the cell C1 to the control signal CN (#201). Successively, the CPU 11 turns the switch DSw ON by setting the control signal DC to "H" level and discharges the electric charge remaining in the integrating condenser Ci. After discharging the electric charge, the control signal DC is set to "L" (#202).

The CPU 11 then outputs the light emitting signal EM and emits measuring light to an object (#203). At this point, the CPU 11 awaits until the time period T1 from the start of the light emission has elapsed to secure the rise times of the respective amplifiers accompanied by the start of light emission and to alleviate influence of power source variations (#204), starts the integrating operation by changing the control signal IN to "H" when the time period T1 has elapsed (#205), and awaits for the time period T2 to elapse (#206). After finishing the operation, the CPU 11 stops light emitting and integrating operations (#207) and awaits for the time period T3 to elapse (#208). The CPU 11 then adds 1 to the number of times K1 (#209). At this point, when the number of times of light emission K1 exceeds 700 (#210), it is determined that the object is disposed at a very long distance and pertinent photographing cannot be conducted and, accordingly, the CPU 11 sets the infinity flag Fi and finishes the subroutine (#211). Further, when K1 does not exceed 700 and the voltage Vint does not reach the voltage Vth, the CPU 11 returns to #203 and repeats light emitting and integrating operations (#212).

When the voltage Vint reaches the voltage Vth, the CPU 11 successively outputs a signal selecting one of the double-cells for measuring distance that is near to the cell C11 to the control signal CN (#213). Successively, the CPU 11 sets the control signal DC to "H" level, turns the switch DSw ON and discharges the electric charge remaining in the integrating condenser Ci. After discharging the electric charge, the control signal DC is set to "L" (#214).

Thereafter, the CPU 11 outputs the light emitting signal EM and emits measuring light to an object (#215). At this point, the CPU 11 awaits until the time period T1 (for example 10 microseconds) has elapsed from the start of light emission to secure the rise times of the respective amplifiers accompanied by the start of light emission and to alleviate influence of power source variations (#216), starts the integrating operation by setting the control signal IN to "H" when the time period T1 has elapsed (#217), and awaits for the time period of T2 to elapse (for example, 10 microseconds) (#218). After finishing the operation, the CPU 11 stops the light emitting and integrating operations (#219) and awaits for the time period T3 to elapse (for example, 200 microseconds) (#220). The CPU 11 then adds 1 to the number of times K2 (#221). At this point, when the number of light emissions K2 exceeds 500 and the control signal GN is 7 (#222, 224), it is determined that the object is at a very long distance and pertinent photographing cannot be conducted and, accordingly, the CPU 11 sets the infinity flag Fi and finishes the subroutine (#211). When the number of light emissions K2 exceeds 500 and the control signal GN is less than 7 (#222, #224), it is determined that the object is at a close distance and pertinent photographing cannot be conducted and, therefore, the CPU 11 sets the close flag Fc and finishes the subroutine (#225). When the number of light emissions K2 does not exceed 500 (#222) and the voltage Vint does not reach the voltage Vth, the CPU 11 returns to #215 and repeats the light emitting and integrating operations (#223). When the voltage Vint reaches the voltage Vth, the CPU 11 finishes the subroutine.

Next, an explanation will be given of the subroutine for the operation of measuring the offset voltage change rate at #008 in FIG. 8 with reference to FIG. 11. When the CPU 11 proceeds to the subroutine, the CPU 11 turns all the switches CS 1 through CS 11 OFF (#301). Successively, the CPU 11 turns the switch DSw ON by setting the control signal DC to "H" level and discharges the electric charge remaining in the integrating condenser Ci. After discharging the electric charge, the control signal DC is set to "L" (#302). The CPU 11 then turns the switch 57 ON and starts the integrating operation at the integrating circuit 58 without emitting light by means of the light emitting element 52 (#303). The CPU 11 then awaits for the time period Tofs (#304) to elapse, turns the switch 57 OFF (#305) to stop the integrating operation, calculates the offset voltage change rate Ofs (#306) and finishes the subroutine.

Although in the above-described embodiment the gain is determined by setting two cells per each double-cell the number of cells constituting one double-cell is not limited to 2. Furthermore, although the distance measuring operation is carried out by couples of double-cells each constituted by two cells, the number of cells constituting each double-cell may be changed in accordance with the magnitude or the shape of the received light beam.

Moreover, the light emitting operation is carried out with respect to all of the double-cells in determining the gain, and the gain determining operation is finished when cells minimizing the gain are found. By this operation carried out using the distance measuring device according to the present invention, the time required for conducting the distance measuring operation can be further shortened as compared to the conventional art.

According to the distance measuring device for a camera of the present invention, a row of photocells, such as SPDs, is used as the light receiving elements and, accordingly, the row of photocells can be formed on a chip of an integrating circuit for measuring distance, which is advantageous in terms of compliance with space requirements, reduction of noise, and reduction of manufacturing costs. Furthermore, a distance is measured by selecting photocells having optimum positions and numbers with respect to the magnitude and shape of incident light beam and, therefore, an area in which external light other than distance measuring light is incident on the photocells is decreased, the signal to noise ratio is promoted, a distance measurement having excellent accuracy is carried out by increasing an amplifying ratio, and the amount of scattered light incident on the distance measuring device is reduced.

I claim:

1. A distance measuring device for a camera, comprising:

light receiving means including a plurality of photocells for receiving light reflected by an object;

an adding circuit for adding outputs of an arbitrary number of photocells from among the plurality of photocells; and control means for selecting a first group of photocells which maximizes a result of the addition performed by the adding circuit, setting a second group of photocells comprising the first group of photocells and a single or a plurality of the photocells contiguous to the first group of photocells, dividing the second group of photocells into a plurality of subgroups, and calculating a distance to the object based on outputs of the respective divided subgroups.

2. A distance measuring device for a camera, comprising:

light emitting means for emitting light to an object;

light receiving means including a plurality of photocells for receiving light emitted by the light emitting means and reflected by the object;

an adding circuit for adding outputs of an arbitrary number of photocells from among the plurality of photocells;

determining means for determining a first group of photocells having a maximum addition result based on the addition performed by the adding circuit; and calculating means for setting a second group of photocells comprised of the first group of photocells and a single or a plurality of photocells contiguous to the first group of photocells, dividing the second group of photocells into element subgroups, and calculating a distance to an object based on outputs of respective divided element groups.

* * * * *